June 14, 1932.  J. E. SEVOY  1,862,553

CONTAINER

Filed Feb. 17, 1930

INVENTOR
John E. Sevoy
BY
Harry Bowen
ATTORNEY

Patented June 14, 1932

1,862,553

UNITED STATES PATENT OFFICE

JOHN E. SEVOY, OF SEATTLE, WASHINGTON

CONTAINER

Application filed February 17, 1930. Serial No. 429,101.

The invention is a container that is particularly adaptable for condensed milk, as the milk may be dumped from a can into a glass jar forming the body of the container, and with the closure in place small openings therein may be opened and closed as desired.

The object of the invention is to provide means for holding condensed milk so that small amounts of the milk may be used as desired.

Another object of the invention is to provide a container for condensed milk which may be readily opened and closed.

A further object of the invention is to provide a container for condensed milk which may be used repeatedly.

And a still further object of the invention is to provide a container with openings that may readily be opened and closed, which is of a simple and economical construction.

With these ends in view the invention embodies, a container similar to a jar with a threaded neck, a cap adaptable to screw upon the neck, a closure resiliently held against the cap, and corresponding openings through the closure and cap.

Other features and advantages of the invention will appear from the following description taken in connection with the drawing, wherein:—

Figure 1:
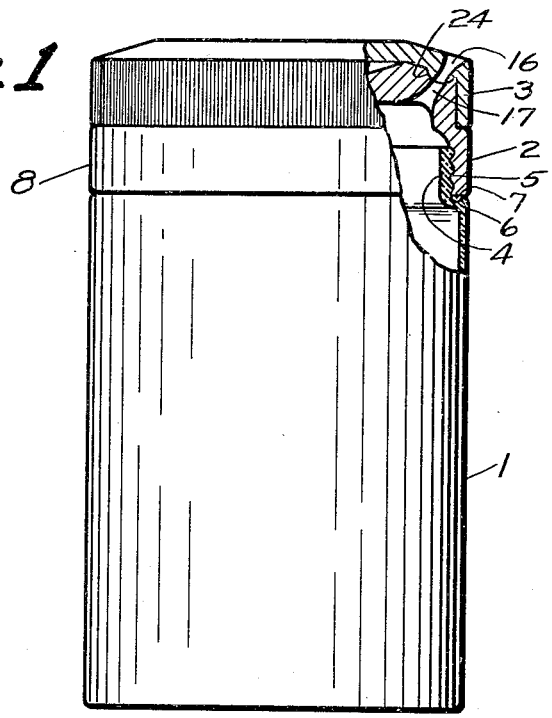
Figure 1 is a side elevation of the container with part broken away.
Figure 2:
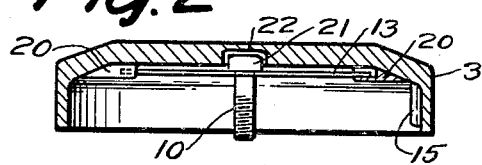
Figure 2 is a cross section through the closure.

In the drawing the container is shown as it would be made wherein numeral 1 indicates the container, numeral 2 the cap, and numeral 3 the closure.

Figure 4:
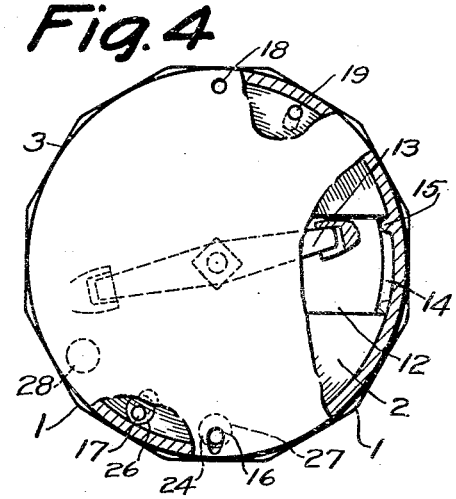
Figure 4 is a plan view with part broken away.

The container 1 may be made of glass or any suitable material, and may be made round as shown in Figure 1, or with flat sides, as shown in Figure 4. In the design shown it is provided with a neck 4, the outer surface of which is threaded as indicated by the numeral 5, and at the base of the threads is a recess 6 in which a gasket or rubber ring 7 may be placed.

Figure 3:
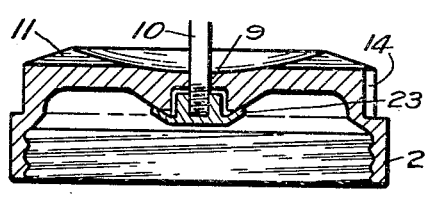
Figure 3 is a cross section through the cap.

The cap 2 is made as shown in Figure 3, with an internally threaded ring 8 which screws upon the neck of the jar, and with an opening 9 in the center, as shown in Figure 3 through which a screw 10 from the closure 3 may extend. The upper surface of the cap 2 is inclined upward as shown at the points 11, and this surface is slotted as indicated by the numeral 12 and shown in Figure 4, to provide space for a spring 13 on the under side of the closure. At one end of the slot 12 is a vertical slot 14 into which a lug 15 on the closure 3 extends as shown to limit the rotary movement of the closure. It will be noted that this lug will permit the closure to move, in relation to the cap, from the position shown in full lines in Figure 4 to the position shown in dotted lines, which movement will permit an outlet opening 16 in the closure to move from the position shown in Figure 4 to such a position that it will correspond with an outlet opening 17 in the cap, and at the same time permit an air opening 18 in the closure to move until it corresponds with a similar opening 19 in the cap, and with these openings corresponding a fluid may readily be poured from the container.

It will be noted that the spring 13 is held in lugs 20 on the under side of the closure, and the screw 10 is held in an opening in the spring. A head 21 of the screw may be held in an opening 22 in the closure to prevent its rotating. The screw 10 extends through the opening 9 in the cap, and a nut 23 is screwed upon the inner end to hold the screw in the cap. It will be observed that when the cap and closure are assembled the closure is held to the cap by the spring and screws so that it will be resiliently held against the upper surface of the cap.

On the under surface of the closure 3 are two lugs 24 and 25, the lug 24 directly below the opening 16 and the lug 25 corresponding with and located in a recess 26 in which the opening 17 is located, when in the position shown in Figure 4. At the same time the lug 24 is in a similar blank recess 27, and it will be observed that when the closure is rotated to the open position the lug 24 will snap into the recess 26, as shown in Figure 1, and the lug 25 will snap into another blank recess 28 in the cap, as shown in dotted lines in Figure 4.

It is understood that changes may be made in the construction without departing from the spirit of the invention. One of which changes may be in the use of other means for attaching the cap to the container, another may be in the use of other means for resiliently holding the closure to the cap, another may in the use of a closure or cap of any other type or design, and still another may be in the arrangement of the openings in the closure and cap.

The construction will be understood from the foregoing description. In use the container may be provided as shown, and it will be observed that when a can of condensed milk is opened, instead of just permitting it to set around, the entire contents may be dumped into the jar wanted and when the cap and closure are placed upon the jar and the closure turned as shown in Figure 4, the jar will be sealed. It may then be opened and closed as desired by rotating the closure as hereinbefore described.

Having thus fully described the invention, what I claim as new and desire to secure by Letters Patent, is:—

1. In a container closure of the type having openings therethrough which may or may not register, a container, a cap with a continuous circular recess at the upper outer edge threaded upon the said container, a closure with a continuous downwardly extending knurled flange rotatable upon said cap with the flange in said recess, said cap having an outwardly sloping opening in the edge thereof, a recess at the upper end of said opening and similar recesses at each side thereof, said closure also having a similar opening also sloping outward, a projection at the inner end of said closure opening adapted to snap into the recess of said cap opening, another projection on said closure adapted to register with one of the recesses at the side of said cap opening, said cap having another opening at the opposite side thereof, said closure having a corresponding opening, said cap having a vertical recess in the side thereof to limit the movement of a projection of the closure, said cap having a transverse recess in the top thereof, a spring held in notches in the under side of said closure and registering in said transverse recess, and a pin extending from said spring through said cap and held downward, holding the spring in tension, from the under side of said cap.

2. In a container closure of the type where a first part screws upon the container and a second part is rotatably mounted over it, positive means for limiting the movement of said second part in relation to the first part, resilient means for holding said second part to said first part, means cooperating with said resilient holding means for locating said second part in different positions upon said first part, said resilient holding means being readily detachable permitting cleaning between said parts, each of said parts having a corresponding outlet opening in the edge thereof and also a corresponding inlet opening in the opposite edges thereof, the whole forming a comparatively thin closure cap for a container of the type having a threaded neck upon which said first part screws.

3. In a container closure of the type where a first part with oppositely positioned openings in the edge thereof screws upon the container and a second part with similar openings is positioned upon said first part and substantially covers the same thereby sealing the space between the two, and where both parts are provided with both limiting and locating means, resilient means for holding said first part to said second part, and means for holding said resilient means in such a manner that the parts may be readily separated, the whole forming a comparatively thin closure cap for a container of the type having a threaded neck upon which said first part screws.

In testimony whereof he affixes his signature.

JOHN E. SEVOY.